H. W. BROADY.
FRICTIONAL GEAR AND BRAKE.
APPLICATION FILED OCT. 17, 1913.
1,200,164.
Patented Oct. 3, 1916.
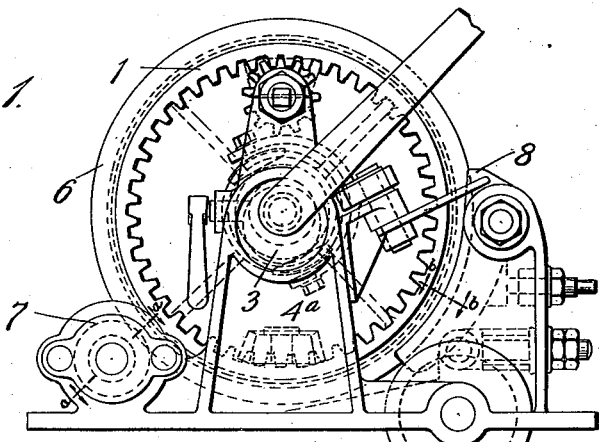
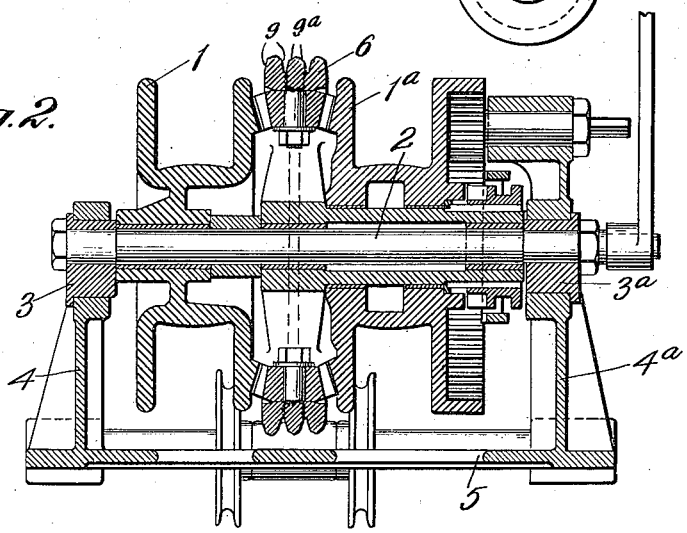
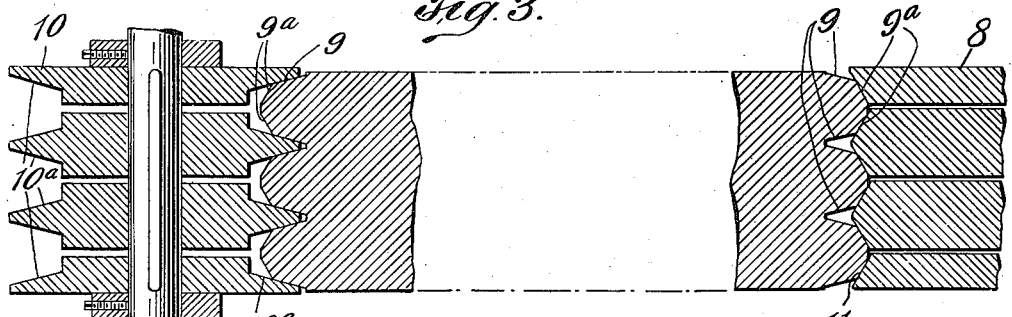

UNITED STATES PATENT OFFICE.

HARRY W. BROADY, OF BAYSIDE, NEW YORK, ASSIGNOR TO WELIN MARINE EQUIPMENT COMPANY, A CORPORATION OF NEW YORK.

FRICTIONAL GEAR AND BRAKE.

1,200,164.  Specification of Letters Patent.  Patented Oct. 3, 1916.

Application filed October 17, 1913. Serial No. 795,681.

*To all whom it may concern:*

Be it known that I, HARRY W. BROADY, a citizen of the United States, and a resident of Bayside, borough of Queens, county of Queens, and State of New York, have invented certain new and useful Improvements in Frictional Gear and Brakes, of which the following is a specification.

This invention relates to improvements in frictional gear and brake mechanism.

By the use of my invention I produce a friction gear and brake mechanism which may be employed with one or more rope drums for handling or manipulating lifeboats or other loads. In my improved mechanism the usual inter-engaging peripheral projections and grooves for the respective friction parts are so designed as to have a better and more effective frictional contact between what I shall term "a load-controlling member" and the driving wheel or the brake-shoe of, for example, a lifeboat handling device and furthermore a relative adjustment of the opposing inter-engaging grooves and projections will be obtained. In the preferred embodiment of my invention, as the same may be applied to a controlling device for handling lifeboats, a single intermediate controlling wheel adapted to be shifted into alternate engagement with a drive located at one side and a brake-shoe located at the other side will be provided with peripheral grooves and projections of poly-angular conformation, that is to say, each groove or projection will have a plurality of frictional engaging faces so as to provide within substantially the same space projections and grooves for the reception, engagement and coöperation with cones or projections of an acute angular conformation, which will be the most effective for driving purposes, and, second, for the reception, engagement and coöperation of projections or cones of obtuse angular conformation, which will be the most effective for the braking purposes. Furthermore, adjustment between the respective inter-engaging projections and grooves will be provided by splitting one or more of the inter-engaging parts, and preferably by splitting the drive wheel and the brake-shoe, longitudinally of the grooves or projections, thus procuring a line contact between each of the respective inter-engaging grooves and projections instead of a point contact between certain of such grooves and projections as has heretofore been the case when the driving wheel, brake-shoe and intermediate controlling wheel have each been formed in one piece.

In the accompanying drawings, in which similar reference characters designate corresponding parts throughout the several views, Figure 1 is a side elevation of apparatus embodying my invention; Fig. 2 is a vertical section on the line 2—2 of Fig. 1; Fig. 3 is an enlarged section on the lines *a—a* and *b—b* respectively of Fig. 1, the intermediate portion of the controlling wheel being broken away.

Referring now to these drawings which illustrate a preferred embodiment of my invention applied to a controlling device for handling lifeboats, 1—1ª indicate a pair of winding drums mounted on a common shaft 2 suitably secured to and supported in eccentric bearings 3—3ª, the eccentric bearings being in turn mounted in standards 4—4ª on a frame 5 which is secured to the deck of a vessel in any suitable position. My preferred means for controlling and rotating said drums comprises, as shown, an intermediate controlling wheel 6 mounted on the shaft 2 and provided with a series of peripheral grooves and projections, which projections and grooves upon the shifting of the controlling wheel laterally in one direction frictionally engage and intermesh with peripheral projections and grooves on a driving wheel 7 rotated from any suitable source of power (not shown), and located at one side of said controlling wheel, and upon the lateral shifting of said controlling wheel in the opposite direction, such peripheral grooves and projections will intermesh and frictionally engage with grooves and projections in a brake-shoe 8 located at the other side of said controlling wheel 6, a lever 2ª coöperating with the eccentrics 3—3ª to shift the shaft 2 and with it said intermediate controlling wheel 6 alternately into engagement with the driving wheel and brake-shoe as desired. The winding drums 1—1ª are preferably suitably locked or connected together and journaled on the shaft 2 so as always to move in the same direction.

In apparatus of this kind heretofore employed, however, the drive wheel has been formed in one piece, the controlling wheel also in one piece and the brake-shoe likewise in one piece and similar grooves and projections have been provided on the controlling wheel and its opposing drive wheel and brake-shoe.

As a result of employing grooves in the opposing or engaging frictional surfaces of similar angles of inclination it has been found impossible heretofore to procure the most effective drive, as well as the most effective braking surface, because if cones of an acute angular conformation, which would be most suitable for driving purposes, were brought into coöperation with a brake cone of similar angle too great friction would occur and the braking effect would be so abrupt as to be dangerous; on the other hand if projections and grooves of an obtuse angular conformation, which would produce the most effective braking action, were brought into coöperation with a drive cone having such an obtuse angular conformation a very imperfect drive would result. It has therefore been usual to employ projections and grooves of a mean or average angle of inclination. By my device, however, I am enabled to employ a drive having cones or projections of an acute angle and also a braking device having cones or grooves of obtuse angular conformation, and in order to permit the use of a single controlling wheel with a drive and a brake-shoe having projections and grooves of different angular conformation, I have employed in the periphery of my controlling wheel projections and grooves of polyangular conformation, that is to say the walls or faces of the peripheral projections and grooves of the controlling wheel have two distinct angles of inclination, as indicated at 9—9ª respectively, the angular walls or faces 9 being adapted to engage with the projections 10 of the driving wheel, and the angular walls or faces 9ª being adapted to engage with the walls or faces 11 of the brake-shoe 8, thus obtaining the most effective friction surfaces for braking and driving respectively. Furthermore, I have found that when, as has heretofore been the case, the opposing grooved and coned members have each been formed in one piece, it was necessary in order to procure proper inter-engagement, that the opposing faces of the grooves and cones or projections must not only have precisely the same angle of inclination but these inclined faces must be accurately and exactly spaced from each other. Such accuracy of construction is extremely difficult, and it has frequently been found, because of inaccuracy of construction, that the cones or projections and grooves engaged only at certain points instead of throughout the full extent of the faces, thus of course detracting from the effectiveness of the drive or braking device as the case might be. In order to overcome this difficulty and to procure a line contact between all of the opposing faces, notwithstanding inaccuracy of construction thereof, I have formed the driving wheel 7 and the brake-shoe 8 of a plurality of parts split longitudinally of the grooves and projections and suitably connected together, sufficient space only being allowed between such parts to permit the slight lateral adjustment necessary to form a perfect contact between such split parts and the opposing faces of the controlling wheel. As shown, both the drive wheel 7 and brake-shoe are split between the respective projections or at the bottom of each of the grooves, though it is obvious that such split may be made at any other suitable point, the drive wheel 7 being keyed to its shaft and the split parts retained in place by suitable collars as illustrated at the left-hand side of Fig. 3. The parts of the brake-shoe may be retained in the same or any other suitable manner. By so splitting the drive and brake-shoe, I procure the slight lateral play necessary to obtain a true line frictional contact or engagement between the opposing faces of the respective members, thereby producing a more effective control than has heretofore been produced.

Having described my invention, I claim:

1. Frictional gear and brake mechanism embodying a driving member having a coned and grooved friction surface with engaging faces of one angle of inclination, a braking member also having a coned and grooved friction surface with engaging faces at another angle of inclination, and a load-controlling member having a grooved surface with angular engaging faces corresponding to and adapted to coöperate alternately with the faces of the drive and brake members respectively, and means for engaging said drive and brake members with the said load-controlling member.

2. Frictional gear and brake mechanism embodying a driving member having a peripheral friction surface composed of a series of similar cones and grooves with engaging faces of a given angle of inclination, a braking member having a peripheral friction surface composed of a series of cones and grooves with engaging faces, having a different angle of inclination, and a load-controlling member, having its surface composed of a series of grooves and projections, each having a plurality of engaging faces of angles of inclination corresponding to and adapted to alternately coöperate with the faces of the drive and brake members respectively, and means for shifting the load-controlling member in opposite directions to alternately engage said drive and brake members.

3. Frictional gear and brake mechanism embodying a friction member, another friction member adapted to coöperate therewith, each of said members being provided with coned and grooved frictional surfaces and one of such members being split longitudinally of its projections and grooves into a plurality of loosely connected parts.

4. Frictional gear and brake mechanism embodying a driving member having a coned and grooved peripheral friction surface, a braking member also having a coned and grooved friction surface, the said driving and braking members being split longitudinally of the cones and grooves, and a load-controlling member having a peripheral surface provided with a plurality of projections and grooves adapted to alternately intermesh and coöperate with the split coned and grooved drive and braking members respectively, and means for shifting the said load-controlling member in opposite directions to alternately engage said drive and brake members.

In witness whereof, I have signed my name to the foregoing specification in the presence of two subscribing witnesses.

HARRY W. BROADY.

Witnesses:
    FREDERICK P. RANDOLPH,
    HELEN V. HOLMES.